United States Patent
Cox et al.

(10) Patent No.: US 8,433,163 B2
(45) Date of Patent: Apr. 30, 2013

(54) BI-DIRECTIONAL SIGNAL INTERFACE WITH ENHANCED ISOLATION

(75) Inventors: Charles Cox, Carlisle, MA (US); Edward I. Ackerman, Cambridge, MA (US)

(73) Assignee: Photonic Systems, Inc, Billerica, MA (US)

( * ) Notice: Subject to any disclaimer, the term of this patent is extended or adjusted under 35 U.S.C. 154(b) by 160 days.

(21) Appl. No.: 12/106,785

(22) Filed: Apr. 21, 2008

(65) Prior Publication Data

US 2009/0263081 A1    Oct. 22, 2009

(51) Int. Cl.
*G02B 6/42*    (2006.01)

(52) U.S. Cl.
USPC .......................................................... 385/39

(58) Field of Classification Search ...................... 385/39
See application file for complete search history.

(56) References Cited

U.S. PATENT DOCUMENTS

| | | |
|---|---|---|
| 2,973,512 A | 2/1961 | Walsh |
| 5,074,631 A | 12/1991 | Hamano et al. |
| 5,287,212 A | 2/1994 | Cox et al. |
| 5,303,079 A | 4/1994 | Gnauck et al. |
| 5,369,381 A | 11/1994 | Gamand |
| 5,389,782 A | 2/1995 | Hilliard |
| 5,488,681 A * | 1/1996 | Deacon et al. ................ 385/37 |
| 5,602,387 A | 2/1997 | Bowen |
| 5,977,911 A | 11/1999 | Green et al. |
| 6,028,695 A | 2/2000 | Uemura et al. |
| 6,081,232 A | 6/2000 | Pittman et al. |
| 6,137,442 A | 10/2000 | Roman et al. |
| 6,175,672 B1 | 1/2001 | Newberg et al. |
| 6,295,395 B1 | 9/2001 | Paek |
| 6,310,706 B1 | 10/2001 | Heidemann et al. |

(Continued)

FOREIGN PATENT DOCUMENTS

| | | |
|---|---|---|
| EP | 0282293 A2 | 9/1961 |
| JP | 57197934 | 12/1982 |
| JP | 09008737 | 1/1997 |

OTHER PUBLICATIONS

"Notification of Transmittal of the International Search Report and the Written Opinion of the International Searching Authority, or the Declaration" for PCT/US2009/041058, Nov. 30, 2009, 11 Pages, International Searching Authority/Korean Intellectual Property Office, Daejeon, Republic of Korea.

(Continued)

*Primary Examiner* — Uyen-Chau N Le
*Assistant Examiner* — Hoang Tran
(74) *Attorney, Agent, or Firm* — Kurt Rauschenbach; Rauschenbach Patent Law Group, LLP (57) ABSTRACT

A bi-directional signal interface includes a carrier signal source that generates a carrier traveling wave at an output. A first traveling wave structure includes a first and a second waveguide having an input that is coupled to the output of the carrier signal source. The first and second waveguide propagate the carrier traveling wave. A second traveling wave structure includes an outgoing signal port that receives an outgoing signal and a bi-directional signal port that receives an incoming electrical signal and provides the outgoing signal. The first and second traveling wave structures have an electromagnetic interaction region with a geometry that is chosen for a desired outgoing-to-incoming signal isolation. A detector having an input coupled to the output of the first traveling wave structure generates an electrical signal related to the incoming electrical signal.

19 Claims, 9 Drawing Sheets

U.S. PATENT DOCUMENTS

| | | |
|---|---|---|
| 6,320,539 B1 | 11/2001 | Matthews et al. |
| 6,330,098 B1 | 12/2001 | Gopalakrishnan |
| 6,337,660 B1 | 1/2002 | Esman et al. |
| 6,393,177 B2 | 5/2002 | Paek |
| 2002/0012500 A1 | 1/2002 | Paek |
| 2002/0106141 A1 | 8/2002 | Gopalakrishnan |
| 2003/0147581 A1 | 8/2003 | Doi et al. |
| 2005/0014472 A1* | 1/2005 | Cox et al. .................. 455/82 |
| 2007/0189778 A1 | 8/2007 | Burns et al. |

OTHER PUBLICATIONS

Ackerman, et al., The Effect of a Mach-Zehnder Modulator's Travelling Wave Electrode Loss on a Photonic Link's Noise Figure, Photonic Systems, Inc., Burlington, MA, USA.

Anderson, Is a Broadband Low Noise Photonic Link an Oxymoron?, Lockheed Martin Advanced Technology Center, Palo Alto, CA, USA.

Wenzel, Charles, Low Frequency Circulator/Isolator Uses No Ferrite or Magnet, RF Design Awards.

Office Action for U.S. Appl. No. 10/710,463, Apr. 9, 2008, 7 pages, The USPTO, US.

Office Action for U.S. Appl. No. 11/353,701, Jul. 25, 2008, 6 pages, The USPTO, US.

"Notification Concerning Transmittal of International Preliminary Report on Patentability (Chapter I of the Patent Cooperation Treaty" for PCT/US2008/003297, Oct. 1, 2009, 8 pages, The International Bureau of WIPO, Geneva, Switzerland.

* cited by examiner

BI-DIRECTIONAL SIGNAL INTERFACE WITH ENHANCED ISOLATION

The section headings used herein are for organizational purposes only and should not to be construed as limiting the subject matter described in the present application.

RELATED APPLICATION SECTION

This application is related to U.S. patent application Ser. No. 10/710,463, filed Jul. 13, 2004, and entitled "Bi-Directional Signal Interface," U.S. patent application Ser. No. 11/353,701, filed Feb. 14, 2006, and entitled "Bi-Directional Signal Interface Using Photonic Coupler," and is related to U.S. patent application Ser. No. 11/687,046, filed Mar. 16, 2007, and entitled "Bi-Directional Signal Interface and Apparatus Using Same." The entire contents of U.S. patent application Ser. Nos. 10/710,463, 11/353,701, and 11/687,046 are incorporated herein by reference.

BACKGROUND SECTION

This invention relates generally to signal interfaces, such as antenna signal interfaces, that can perform both transmit and receive functions. An antenna is a conductive structure that carries an electrical current when energized. Antennas are used to transmit and receive electromagnetic waves. When a time-varying electrical current is electrically coupled to an antenna, the antenna will radiate an electromagnetic wave. When a time-varying electromagnetic field is received by an antenna, the antenna will generate a time-varying electrical current.

Signal interfaces are used to efficiently transfer power. For example, an antenna signal interface is used to efficiently transfer power between an antenna and transmit and/or receive electronics. A transmit antenna interface is designed to transfer power efficiently from a transmission line that electrically couples a transmitter to the antenna. A receiver antenna interface is designed to transfer power efficiently from the antenna to a transmission line that is electrically coupled to a receiver.

A transceiver antenna interface is a bi-directional signal interface that is designed to transfer power efficiently from a transmission line that is electrically coupled to a transmitter to the antenna and also is designed to transfer power efficiently from the antenna to a transmission line that is electrically coupled to a receiver while minimizing the coupling of power between the transmit transmission line and the receive transmission line.

BRIEF DESCRIPTION OF THE DRAWINGS

The aspects of this invention may be better understood by referring to the following description in conjunction with the accompanying drawings. Identical or similar elements in these figures may be designated by the same reference numerals. Detailed descriptions about these similar elements may not be repeated. The drawings are not necessarily to scale. The skilled artisan will understand that the drawings, described below, are for illustration purposes only. The drawings are not intended to limit the scope of the present teachings in any way.

DETAILED DESCRIPTION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

It should be understood that the individual steps of the methods of the present invention may be performed in any order and/or simultaneously as long as the invention remains operable. Furthermore, it should be understood that the apparatus and methods of the present invention can include any number or all of the described embodiments as long as the invention remains operable.

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

One important figure of merit for a bi-directional signal interface is the degree of isolation that can be achieved between the outgoing and incoming signals. In practice, the amplitude of the outgoing signal is typically much greater than the amplitude of the incoming signal. Consequently, if there is substantial leakage of the strong outgoing signal into the weaker incoming signal path, then the strong outgoing signal leakage can dominate over the weaker incoming signal (or at least interfere with the weaker incoming signal), thereby limiting the ability to detect the weak incoming signal.

One technique for implementing a bidirectional signal interface was disclosed in related U.S. patent application Ser. No. 10/710,463, filed Jul. 13, 2004, and entitled "Bi-Directional Signal Interface," which is assigned to the present assignee. This patent application teaches that the difference between the co- and counter-propagating interactions of two traveling-wave structures could be used to implement a bi-directional signal interface. The outgoing-to-incoming (O/I) isolation of the bidirectional signal interface described in U.S. patent application Ser. No. 10/710,463 is greater than what can be achieved using other isolation techniques known in the art. There are, however, some particularly demanding applications that require higher O/I isolation than can be achieved with the method and apparatus described in U.S. patent application Ser. No. 10/710,463.

Figure 1:
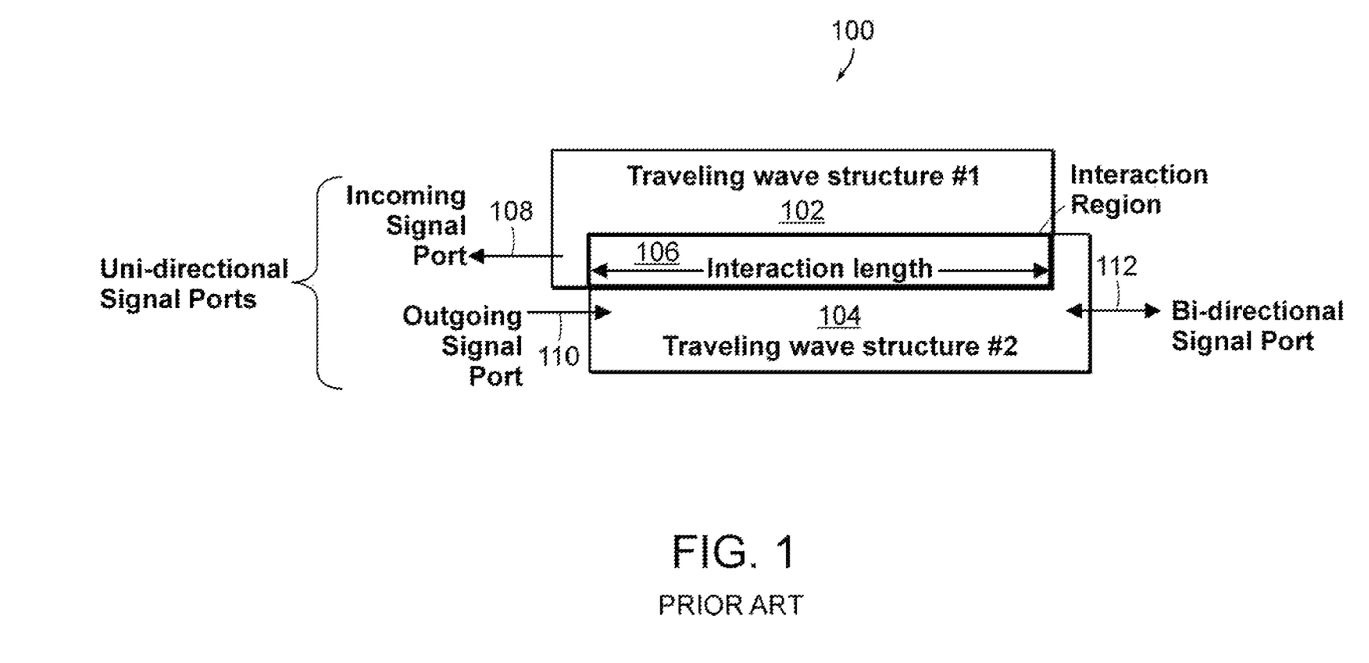
FIG. 1 illustrates a block diagram of a bi-directional signal interface.

FIG. 1 illustrates a block diagram of a bidirectional signal interface 100. The bi-directional signal interface 100 includes a first 102 and a second traveling-wave structure 104 that together have an interaction region 106 defined by an interaction length, L. The bi-directional signal interface 100 includes an incoming signal port 108 and an outgoing signal port 110. Both the incoming signal port 108 and the outgoing signal port 110 are unidirectional ports. In addition, the bi-directional signal interface 100 has a bi-directional port 112 where both incoming and outgoing signals can be present.

In operation, the bi-directional signal interface 100 conveys the outgoing signal from the outgoing signal port 110 to the bidirectional port 112 and the incoming signal from the bidirectional port 112 to the incoming signal port 108 with very high efficiency. Also, a very high degree of isolation is provided between the outgoing signal port 110 and incoming signal port 108. In some applications, there is a substantial difference in interaction strength between the co-propagating and counter-propagating waves traveling in the interaction region 106.

Figure 2A:
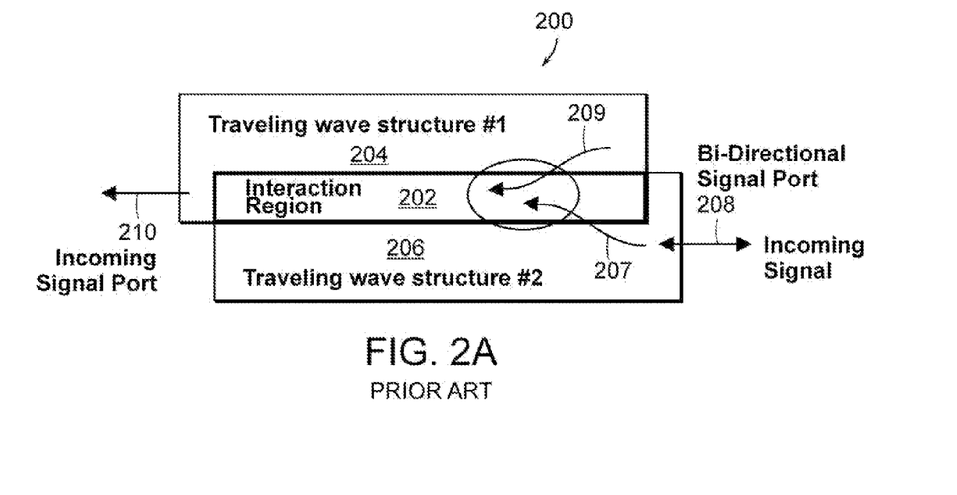
FIG. 2A illustrates a block diagram of a bi-directional signal interface where the incoming signal and carrier traveling waves co-propagate in an interaction region.
Figure 2B:
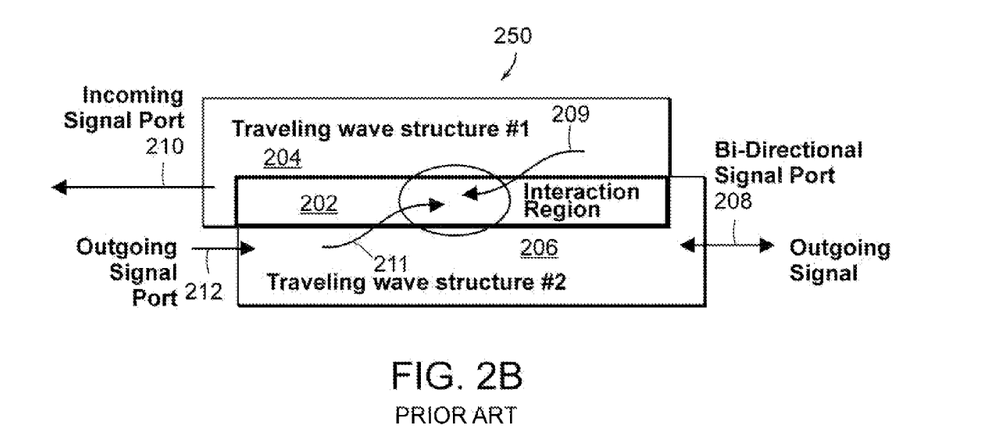
FIG. 2B illustrates a block diagram of the bi-directional signal interface described in FIG. 2A where the carrier and outgoing signal traveling waves counter-propagate in the interaction region.

FIG. 2A illustrates a block diagram of a bi-directional signal interface 200 where the incoming signal and carrier traveling waves co-propagate in an interaction region 202. FIG. 2B illustrates a block diagram of the bi-directional signal interface 250 where the carrier and outgoing signal traveling waves counter-propagate in the interaction region 202. These types of bi-directional signal interfaces are described in U.S. patent application Ser. No. 10/710,463, filed Jul. 13, 2004, and entitled "Bi-Directional Signal Interface," which is assigned to the present assignee.

The bi-directional signal interfaces 200, 250 include a first traveling wave structure 204 and a second traveling wave structure 206. The bi-directional signal interfaces 200, 250 also include a bi-directional signal port 208 and an incoming signal port 210. The interaction region 202 overlaps the first and second traveling wave structure 204, 206.

The bi-directional signal interface 200 of FIG. 2A and the bi-directional signal interface 250 of FIG. 2B work in a manner described in the following paragraphs. The following paragraphs describe the incoming signal and outgoing signal paths. In practice, the incoming and outgoing signals may be applied to the same structure simultaneously. However, for clarity of explanation, the descriptions of the incoming and outgoing signal paths are described separately.

The incoming signal 207 is applied to the bi-directional signal port 208 and then propagates in the second traveling wave structure 206 as shown in FIG. 2A. A carrier traveling wave 209 propagates in the first traveling wave structure 204 as shown in FIG. 2A. There is a strong interaction between the co-propagating incoming signal and carrier traveling waves in the interaction region 202 as shown in FIG. 2A. Thus, there is an efficient conveying of the incoming signal 207 by the carrier wave 209 from the bi-directional port 208 to the incoming signal port 210. In other words, there is an efficient modulation efficiency of the incoming signal 207 on the carrier traveling wave 209.

Either simultaneously or at a separate time, the outgoing signal 211 is applied to the outgoing signal port 212 as shown in FIG. 2B. The outgoing signal 211 counter-propagates with respect to the carrier traveling wave 209. The result is an efficient conveying of the outgoing signal 211 to the bi-directional port 208, but an inefficient interaction of the outgoing signal 211 with the carrier traveling wave 209. This inefficient interaction improves the isolation between the incoming signal port 210 and the outgoing signal 211, which is desired for most applications. This type of bi-directional signal interface with high isolation can be implemented with an optical modulator.

Figure 3:
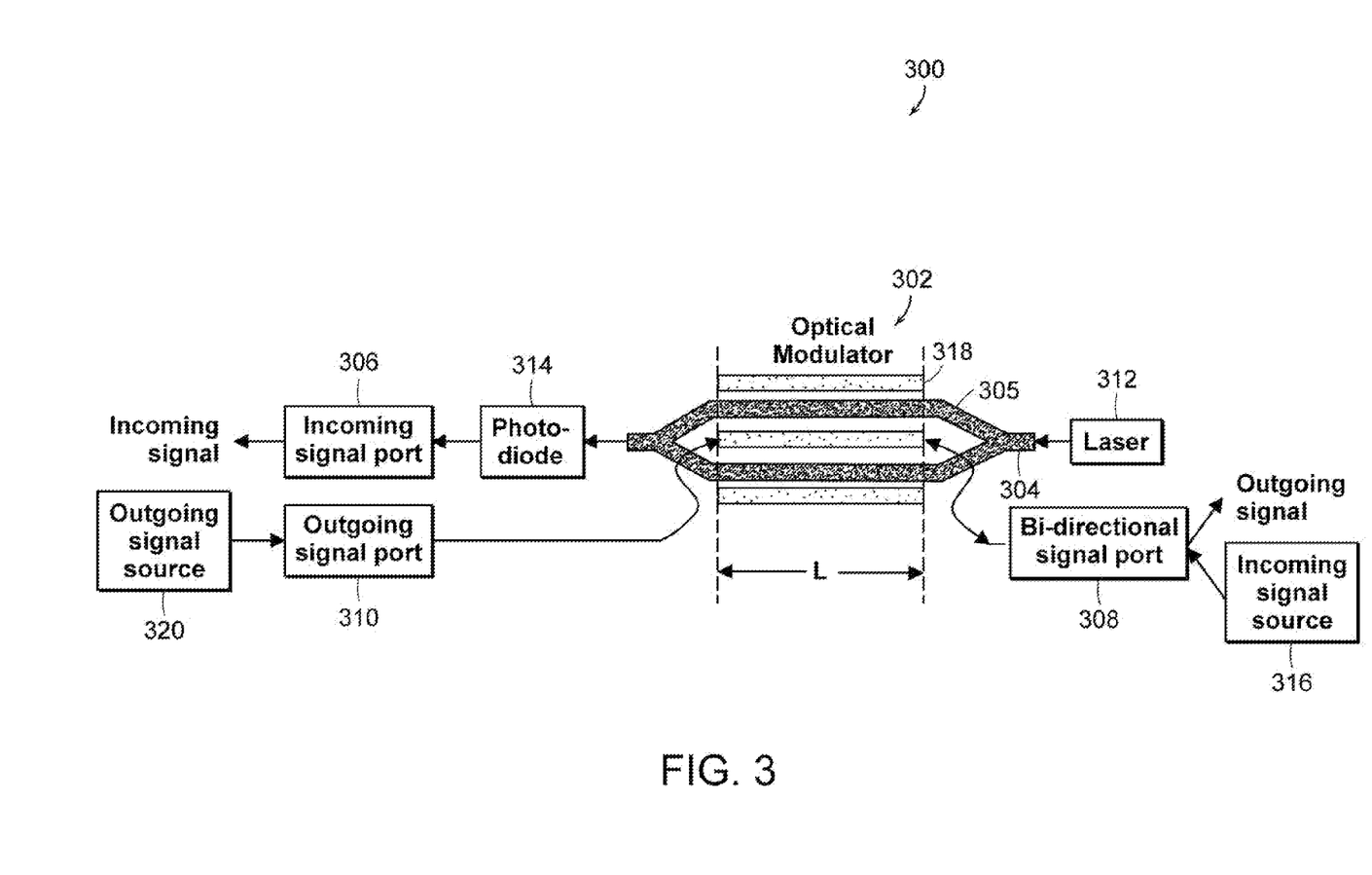
FIG. 3 illustrates a block diagram of a bi-directional signal interface with high isolation that is implemented with an optical modulator.

FIG. 3 illustrates a block diagram of a bi-directional signal interface 300 with high isolation that is implemented with an optical modulator. The interface 300 uses a Mach-Zehnder (MZ) interferometric modulator 302. The interface 300 includes an optical input port 304 where the carrier traveling wave is introduced, an incoming signal port 306, a bi-directional signal port 308, and an outgoing signal port 310. The optical input port 304 of the optical waveguide 305 is optically connected to a laser 312 or other optical source that generates an optical carrier wave, such as a CW optical carrier wave or any other type of optical carrier wave. An incoming signal port 306 is electrically coupled to a photodiode 314 that receives the optical carrier propagating through the optical waveguide 305.

The bi-directional signal port 308 receives an incoming signal and provides an outgoing signal. For example, the bi-directional signal port 308 can be electrically connected to an antenna that performs both reception and transmission. Also, the bi-directional signal port 308 can be electrically connected to an incoming signal source 316. The bi-directional signal port 308 is electrically connected to the first end of the electrical waveguide electrode structure 318. The outgoing signal port 310 receives an outgoing signal from an outgoing signal source 320. The outgoing signal port 310 is electrically connected to the second end of the electrical waveguide electrode structure 318.

In operation, an incoming signal is received at the bi-directional signal port 308 and then propagates through the bi-directional signal port 308 and into the first end of electrical waveguide electrode structure 318. The incoming signal is then coupled to the optical carrier beam propagating in the MZ modulator optical waveguides 305 in a non-reciprocal manner (i.e., the optical carrier beam does not couple to the bi-directional signal port 308). The co-propagation of the incoming signal and carrier traveling waves provides a relatively long interaction time between these two waves. Hence the incoming signal is efficiently modulated on the optical carrier beam generated by the laser 312. The optical carrier beam modulated by the incoming signal then exits the Mach-Zehnder interferometer 302 and is detected by the photodiode 314. The photodiode 314 generates an electrical signal at the incoming signal port 306 that is related to the incoming signal that was modulated on the optical carrier wave.

The outgoing signal generated by the outgoing signal source is applied to the outgoing signal port 310. The outgoing signal is applied to the electrical waveguide electrode structure 318. The outgoing signal propagates through the electrical waveguide electrode structure 318 to the bi-directional signal port 308. The counter-propagation of the outgoing and carrier traveling waves provides a relatively short interaction time between these two waves. Hence the outgoing signal is inefficiently modulated onto the optical carrier beam.

Thus, the bi-directional signal interface 300 propagates three different signals through the MZ modulator 302: the incoming signal, the outgoing signal, and the carrier wave. Consequently, there are two primary modulator design parameters. The first primary modulator parameter is the modulation efficiency, which is the efficiency with which the incoming signal is impressed on the carrier wave. All known prior art modulators are designed to optimize this parameter. The second primary modulator parameter is the outgoing-to-incoming (O/I) signal isolation, which is essentially the inefficiency with which the outgoing signal modulates the carrier wave. The isolation parameter and the tradeoff between the isolation parameter and the modulation efficiency are important factors in signal interfaces according to the present invention.

The O/I signal isolation is a function of several parameters. For example, the O/I signal isolation is a function of the direction of propagation. The sensitivity of the MZ modulator 302 to the electrical signal propagating in the direction that is opposite to the optical carrier beam is lower than the sensitivity of the MZ modulator 302 to the electrical signal propagating in the direction of the optical carrier beam.

Known prior art optical modulators are designed to efficiently impress an electrical modulation signal onto an optical carrier. That is, typical optical modulators are designed to maximize the modulation efficiency or at least to have high modulation efficiency. Optical modulators are designed to maximize or have high modulation efficiency because known systems using optical modulators are designed to operate with high efficiency modulation. In such known systems, the modulator's ability to provide O/I signal isolation is not a design parameter. Consequently, modulator designers design optical modulators for maximum modulation efficiency without considering to O/I signal isolation.

Known bidirectional interfaces using optical modulators, such as the bi-directional interfaces described in U.S. patent application Ser. No. 10/710,463, filed Jul. 13, 2004, and entitled "Bi-Directional Signal Interface," were reduced to practice using modulators that were designed for prior art optical modulator applications. That is, the optical modulators in these systems were designed to propagate only one signal and to efficiently modulate that signal onto an optical carrier. In other words, prior art systems using optical modulators only optimize the efficiency of conveying the incoming signal to the incoming signal port and do not consider using these same devices for a bidirectional signal interface.

Figure 4A:
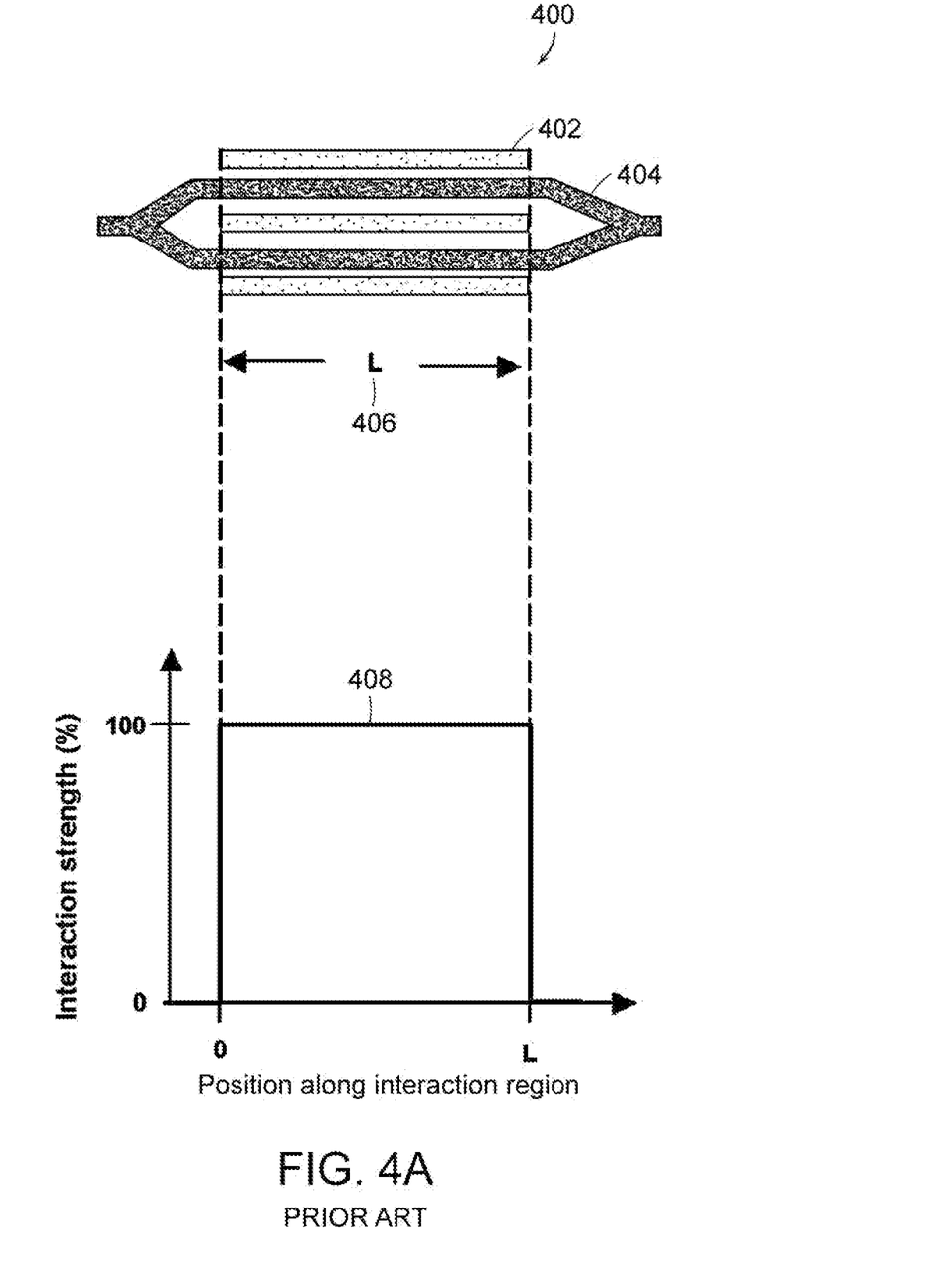
FIG. 4A illustrates a diagram of a known Mach-Zehnder (MZ) interferometric modulator that is designed to optimize the efficiency of modulation.

FIG. 4A illustrates a diagram of a known Mach-Zehnder (MZ) interferometric modulator 400 that is designed to optimize modulation. The modulator 400 includes modulation electrodes 402 that are in close proximity to the optical waveguides 404 along the entire interaction length, L 406. The diagram also includes an electromagnetic interaction function 408 that shows the strength of the electromagnetic interaction between the modulation electrodes 402 and the optical waveguides 404 along the interaction length, L 406. The interaction function 408 has an ideal pulse-like shape with a constant electromagnetic interaction of 100% along the entire interaction region of the modulator 400. That is, the electromagnetic interaction is maximum and constant over the entire interaction length, L 406. Therefore, such a modulation electrode and optical waveguide geometry is designed to maximize the interaction strength of the electromagnetic interaction over the full interaction length, L 406.

It should be understood, however, that FIG. 4A is an idealized drawing of a prior art modulation electrode and optical waveguide geometry in which the modulation electrodes transition between zero and 100% electro-optic interaction at a single point (i.e. there is no physical transition length between the zero and 100% electro-optic interaction). Manufactured optical modulators have some slight tapering in a physical transition region between zero and 100% electro-optic interaction because the transition from zero to 100% electro-optic interaction occurs over some finite distance. However, in manufactured modulators, this transition region is not present for the purpose of tailoring the interaction region to improve outgoing-to-incoming signal isolation as described herein.

Figure 4B:
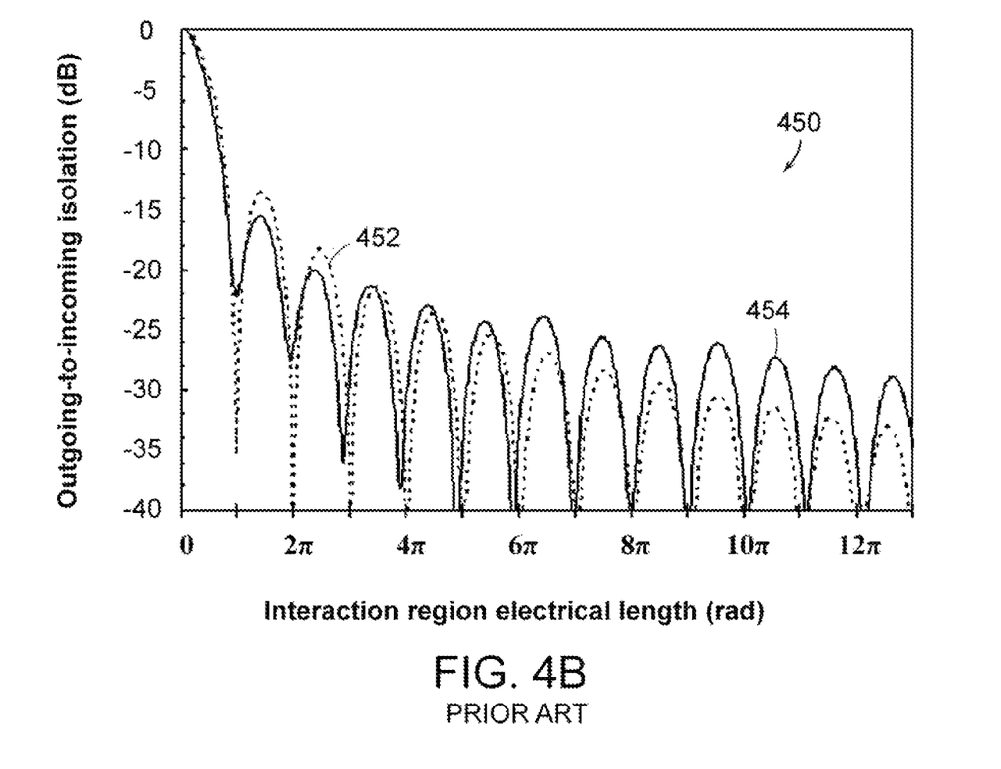
FIG. 4B illustrates a graph of outgoing-to-incoming (O/I) signal isolation in dB as a function of the electrical length of the interaction region in the MZ modulator that is described in connection with FIG. 4A.

FIG. 4B illustrates a graph 450 of outgoing-to-incoming (O/I) signal isolation in dB as a function of the electrical length of the interaction region in the MZ modulator 400 that is described in connection with FIG. 4A. The graph 450 shows the strength of the coupling between the two traveling-wave modulation electrode structures as a function of interaction length. The graph 450 presents a plot 452 of theoretical data for O/I isolation vs. interaction region electrical length. In addition, the graph 450 presents a plot 454 of measured O/I isolation data for a known MZ modulator 400 having a 7 cm interaction length. The plots 452, 454 indicate relatively good agreement between theory and measurement.

The O/I isolation in dB over the entire bandwidth achieved using prior art modulators, which were not designed to achieve O/I isolation, was relatively high (i.e., had a relatively large negative value). In fact, bi-directional signal interfaces using known MZ modulators, such as the bi-directional signal interfaces described in U.S. patent application Ser. No. 10/710,463, filed Jul. 13, 2004, and entitled "Bi-Directional Signal Interface," have higher isolation than any other known type of bi-directional interface. In particular, these bi-directional signal interfaces have much higher isolation than bi-directional interfaces constructed with ferrite circulators. Although such bi-directional signal interfaces have impressive isolation, there are some applications of bi-directional signal interfaces that require even greater O/I isolation than is possible to achieve with bi-directional signal interfaces using known MZ modulators.

An optical modulator according to the present invention is specifically designed to provide both high modulation efficiency and high isolation between incoming and outgoing signals. Thus, an optical modulator according to the present invention simultaneously meets two primary objectives. The first primary objective is that the optical modulator of the present invention efficiently conveys the incoming signal. The second primary objective is that the optical modulator of the present invention has high isolation between the incoming and the outgoing signals.

The two primary objectives are related. Adding loss to the incoming signal path will increase the isolation of the incoming and outgoing signals, but will also decrease the portion of the incoming signal at the bidirectional port that is conveyed to the incoming signal port. In fact, if too much loss is added to the incoming signal path, only a small fraction of the incoming signal at the bi-directional port will be conveyed to the incoming signal port. In the extreme case where so much loss is added to the incoming signal path that none of the incoming signal at the bi-directional port will be conveyed to the incoming signal port, the O/I isolation would be infinite. A bi-directional interface with infinite isolation is highly desirable. However, such a bi-directional interface would not perform the desired functions of a bidirectional interface because it would not convey the incoming signal from the bi-directional port to the incoming signal port.

A signal interface according to the present invention is designed to provide both a high degree of isolation of the incoming and outgoing signals and an efficient conveyance of the incoming signal from the bi-directional port to the incoming signal port. In the embodiment where the optical modulator is used in the bi-directional interface of the present invention, it has been discovered that by properly choosing the function expressing the electromagnetic interaction between the modulation electrodes and the optical waveguides, there can be a substantial improvement in O/I isolation with only a small degradation in incoming signal conveyance efficiency.

In particular, it has been discovered that the constant electromagnetic interaction function 408 (see FIG. 4A) of prior art modulators makes its transition to and from 0 to 100% electro-optic interaction in a step-like fashion. A Laplace transform can be used to transform the associated step-like electromagnetic interaction function 408 from the time domain to the frequency domain with the sin(x)/x function, where x is the electrical length of the interaction region. Such a Laplace transform is well known in the art. The Laplace transform of the step-like electromagnetic interaction function 408 in the time domain is the outgoing-to-incoming (O/I) isolation waveform as a function of the electrical length of the interaction region. FIG. 4B is a plot of 10 times the log of the square of the Laplace transform.

One aspect of the present invention is that by tapering the beginning and the end of the electromagnetic interaction function of a MZ modulator more gradually than a step function, the corresponding outgoing-to-incoming (O/I) isolation as a function of interaction region electrical length (which is proportional to signal frequency) decreases faster than the sin(x)/x function. In various embodiments, the tapering of the beginning can be symmetrical or asymmetrical with the tapering of the end of the electromagnetic interaction function of the MZ modulator. The O/I isolation of the counter-propagating waves increases as a result of the tapering. However, tapering the electromagnetic interaction function would mean that the co-propagating waves are not experiencing maximum interaction over the entire interaction length, L 406. Hence the efficiency of conveying the incoming signal would decrease.

One might expect that there would be a one-for-one correspondence between the percentage improvement in O/I isolation in the bi-directional interface and the percentage of reduction in efficiency of conveying the incoming signal to the incoming signal port. It has been discovered, however, that the O/I isolation can be greatly improved with only a minor reduction in efficiency of conveying the incoming signal to the incoming signal port. For example, in one specific embodiment of the bi-directional interface of the present invention, an electromagnetic interaction function of the MZ modulator is chosen so that O/I isolation is improved by a factor of 10,000 and the loss of the incoming signal efficiency is reduced by only a factor of 2 compared with the step-like interaction function 408 described in connection with FIG. 4A.

Tapering the modulation electrodes as described herein is a type of apodization. The term "apodization" is defined herein as a method for modifying the modulation efficiency of the MZ optical modulator by varying the electromagnetic interaction function of the modulation electrodes and the optical waveguides of the optical modulator used in the bi-directional interface. In particular, apodization is used to modify the O/I isolation and the efficiency of conveying the incoming signal to the incoming signal port of a bi-directional interface by varying the electromagnetic interaction function of the MZ modulator. Apodization is a technique commonly used to shape sidelobes of antennas. However, tapering electrodes or apodization has not previously been used to improve the O/I isolation of bi-directional signal interface using co-propagating and counter-propagating waves as described herein.

Figure 5A:
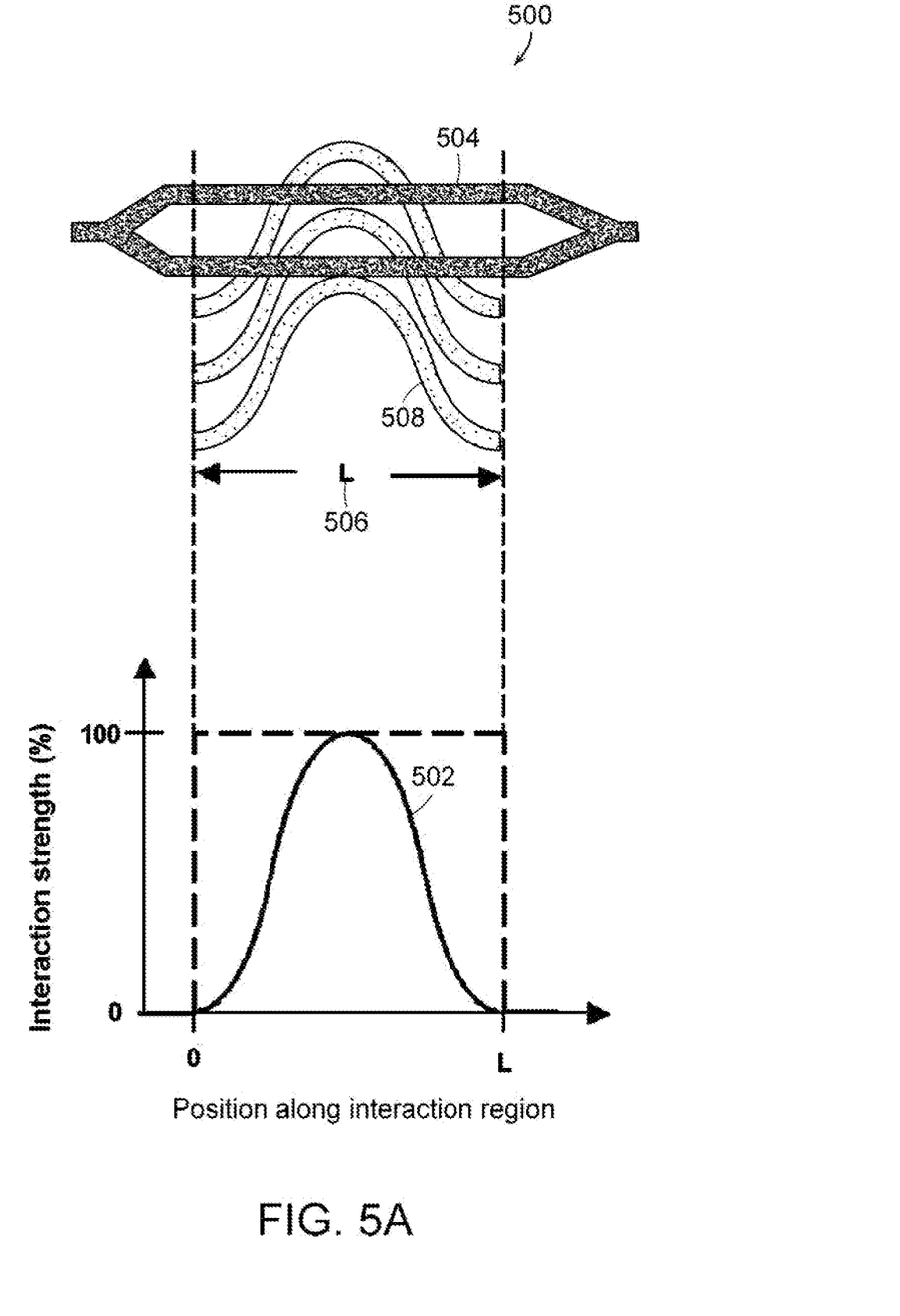
FIG. 5A illustrates a diagram of one embodiment of a Mach-Zehnder (MZ) interferometric modulator according to the present invention that is designed to improve O/I isolation when configured as a high performance bi-directional interface and the associated tapered electromagnetic interaction function.
Figure 6A:
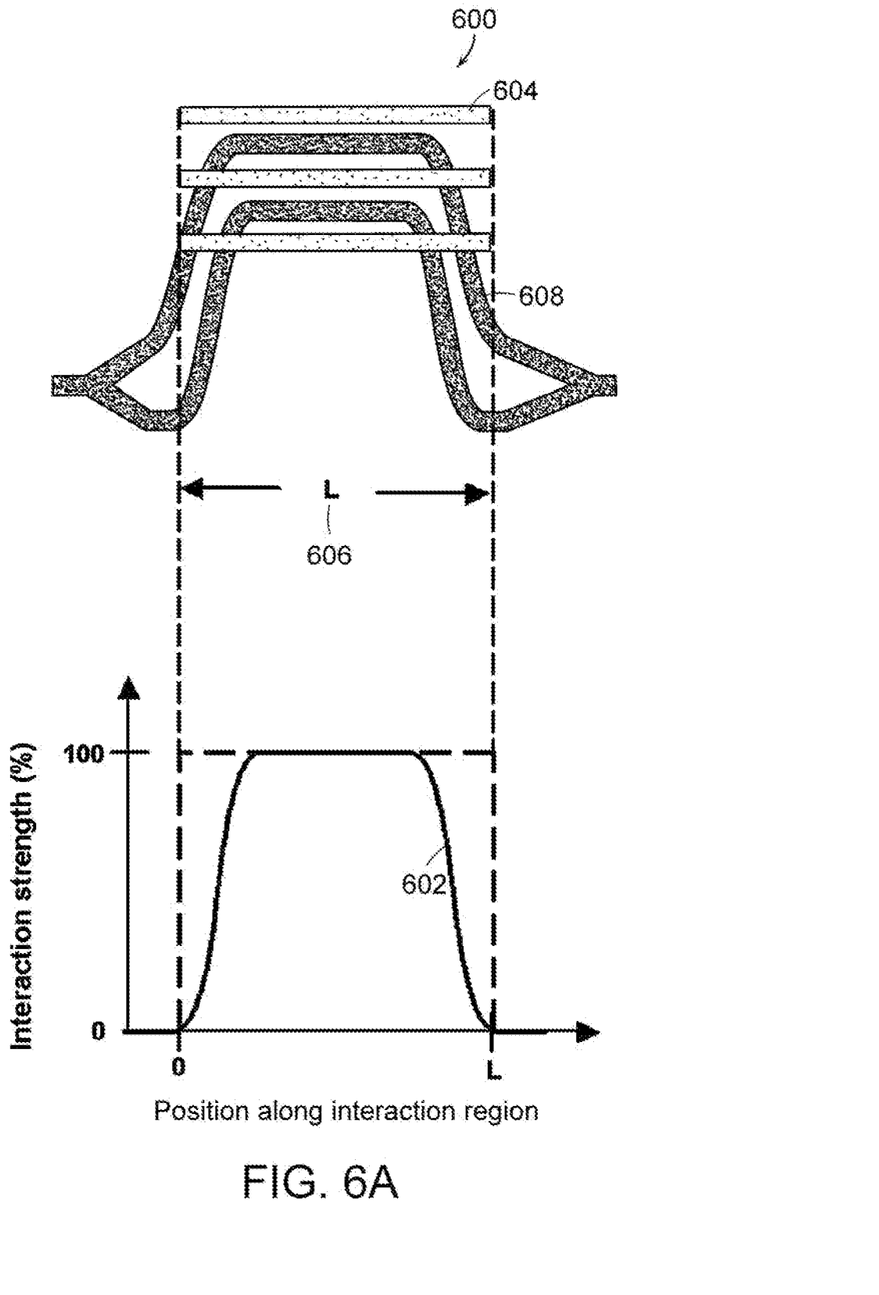
FIG. 6A illustrates a diagram of another embodiment of a Mach-Zehnder (MZ) interferometric modulator according to the present invention that is designed to improve O/I isolation when configured as a high performance bi-directional interface and the associated tapered electromagnetic interaction function.

FIGS. 5A and 6A present two embodiments of MZ modulators according to the present invention where apodization was performed to modify the O/I isolation and the efficiency of conveying the incoming signal to the incoming signal port by varying the electromagnetic interaction function of the MZ modulator. The O/I isolation and the efficiency of conveying the incoming signal were modified to achieve characteristics that are suitable for a high performance bi-directional interface.

FIGS. 5A and 6A present two different modulation electrode and optical waveguide geometries that can achieve an electromagnetic interaction function with improved O/I isolation when these modulators are configured as bi-directional interfaces according to the present invention. These two different modulation electrode and optical waveguide geometries result in two different electromagnetic interaction functions, which are also presented in FIGS. 5A and 6A, and two different resulting O/I isolation characteristics that are presented in FIGS. 5B and 6B, respectively.

FIG. 5A illustrates a diagram of one embodiment of a Mach-Zehnder (MZ) interferometric modulator 500 according to the present invention that is designed to improve O/I isolation when configured as a high performance bi-directional interface and the associated electromagnetic interaction function 502. The modulator 500 presented in FIG. 5A includes optical waveguides 504 that are straight over the interaction region 506 and modulation electrodes 508 that rapidly taper away from the straight portion of the optical waveguides 502. Both the electrical modulation electrodes 508 and the optical waveguides 504 are traveling-wave structures. FIG. 5A illustrates that the tapers at both ends of the interaction region 506 are symmetrical. However, it should be understood that in other embodiments the taper at one end of the interaction region 506 can be asymmetrical with respect to the taper at the other end of the interaction region 506.

The interaction region 506 is where the electromagnetic interaction occurs. The interaction region 506 comprises an electro-optic material, such as inorganic lithium niobate, some semiconductors, such as GaAs and InP, or some type of an organic electro-optic polymer. These and other electro-optic materials are well known in the art. The modulation electrodes 508 have a geometry that is specifically chosen so as to achieve a particular electromagnetic interaction function that will improve O/I isolation while conveying the incoming signal with acceptable efficiency when the modulator is configured as a bi-directional interface.

The interaction function 502 is a tapered electromagnetic interaction function. The term "tapered electromagnetic interaction function" is defined herein to mean an electromagnetic interaction function that is not constant over the interaction region 506. There are various ways of achieving an electromagnetic interaction function that is not constant as described herein. In the particular example shown in FIG. 5A, the electromagnetic interaction function 502 is a cosine function. For this example, transitions to and from the maximum interaction each require exactly half the total interaction length, leaving essentially a single point at the center of the interaction length where maximum interaction occurs. It has been analytically determined that using such a tapered electromagnetic interaction function results in a significant improvement in O/I isolation, with a reduction of incoming signal conveyance efficiency by about 75%.

Figure 5B:
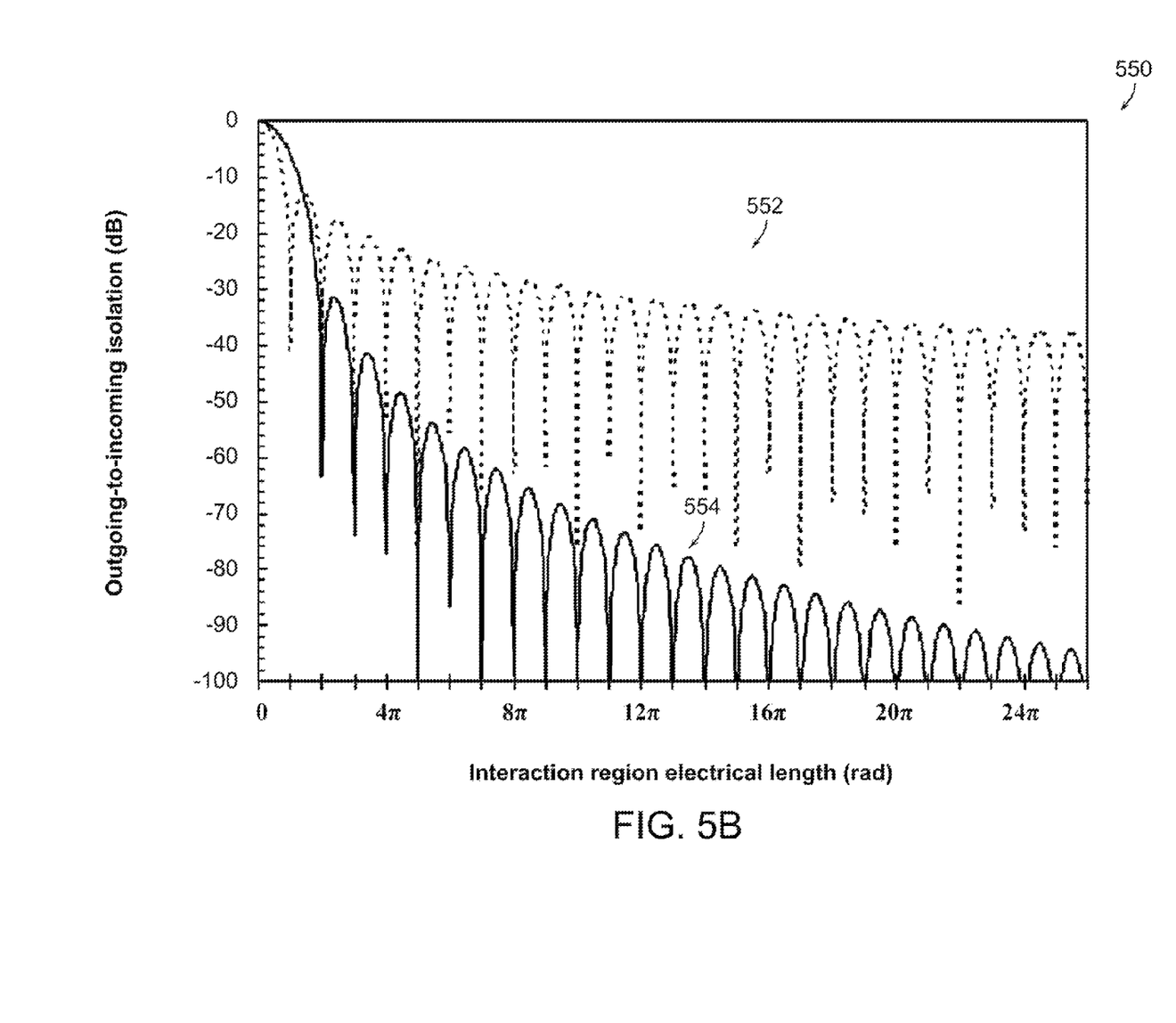
FIG. 5B illustrates a graph of the calculated O/I isolation as a function of the electrical length of the interaction region for both the conventional non-tapered electromagnetic interaction function shown in FIG. 4A and the tapered electromagnetic interaction function shown in FIG. 5A.

FIG. 5B illustrates a graph 550 of the calculated O/I isolation as a function of the electrical length of the interaction region (which is proportional to modulation signal frequency) for both the conventional non-tapered electromagnetic interaction function 408 shown in FIG. 4A (curve 552) and the tapered electromagnetic interaction function 502 shown in FIG. 5A (curve 554). The electromagnetic interaction function and the resulting O/I isolation are mathematically related. The O/I isolation data was determined by calculating the overlap integral of the RF electric field traveling along the modulation electrodes 508 with the optical field propagating through the optical waveguides 504.

FIG. 6A illustrates a diagram of another embodiment of a Mach-Zehnder (MZ) interferometric modulator 600 according to the present invention that is designed to improve O/I isolation when configured as a high performance bi-directional interface and the associated tapered electromagnetic interaction function 602. The modulator 600 presented in FIG. 6A includes modulation electrodes 604 that are straight over the interaction region 606 and optical waveguides 608 that are straight over a portion of the interaction region 606 and then taper away from the straight modulation electrodes 604. That is, in this embodiment of the MZ interferometric modulator there are both constant and tapered interaction regions over the interaction length region 606. Both the electrical modulation electrodes 604 and the optical waveguides 606 are traveling-wave structures.

FIG. 6A also shows the tapered electromagnetic interaction function 602 as a function of position along the interaction region. The resulting tapered electromagnetic interaction function 602 is an interrupted cosine function. The interrupted cosine electromagnetic interaction function is a less drastic departure from the constant-interaction electromagnetic interaction function 408 described in FIG. 4A than the full cosine electromagnetic interaction function 502 described in connection with FIG. 5A. Analysis has shown that the interrupted cosine electromagnetic interaction function 602 produces almost as much improvement in O/I isolation as the full cosine function 502 described in connection with FIG. 5A. However, using the interrupted cosine function results in much less degradation of the incoming signal efficiency relative to the constant-interaction function shown in FIG. 4A. For example, analysis of one specific example in which a tapered interaction occurs over only one quarter of the total interaction length has shown that the efficiency of conveying the incoming signal to the incoming signal port has only been reduced by 23.4%. Thus, optical modulators designed according to the present invention can achieve greatly improved O/I isolation compared with known optical modulators while keeping the reduction in efficiency of conveying the incoming signal to the incoming signal port to an acceptable level.

Figure 6B:
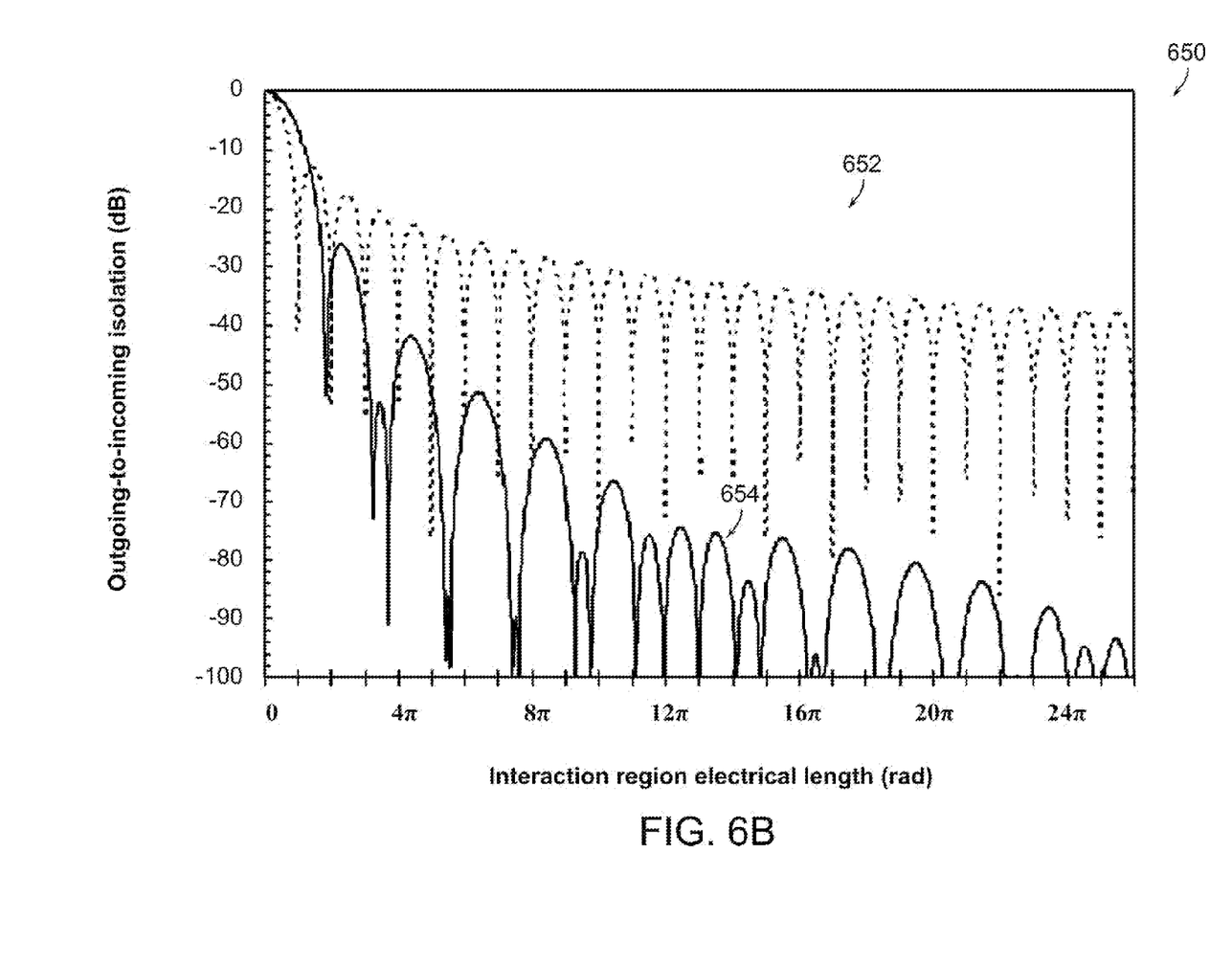
FIG. 6B illustrates a graph of the calculated O/I isolation as a function of the electrical length of the interaction region for both the conventional non-tapered electromagnetic interaction function shown in FIG. 4A and the tapered electromagnetic interaction function shown in FIG. 6A.

FIG. 6B illustrates a graph 650 of the calculated O/I isolation as a function of the electrical length of the interaction region (which is proportional to the modulation signal frequency) for both the conventional non-tapered electromagnetic interaction function 408 shown in FIG. 4A (curve 652) and the tapered electromagnetic interaction function 602 shown in FIG. 6A (curve 654). The electromagnetic interaction function and the resulting O/I isolation are mathematically related. The O/I isolation data was determined by calculating the overlap integral of the RF electric field traveling along the modulation electrodes with the optical field propagating through the optical waveguides.

It should be understood that there are many other possible electrical modulation electrode and optical waveguide geometries that achieve high output-to-input signal isolation and acceptable efficiency of conveying the incoming signal to the incoming signal port according to the present invention. For example, another possible modulation electrode and optical waveguide geometry within the scope of the present invention includes modulation electrode and optical waveguides that are both tapered.

EQUIVALENTS

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, may be made therein without departing from the spirit and scope of the invention.

What is claimed is:

1. A bi-directional signal interface comprising:
    a. a carrier signal source that generates a carrier traveling wave at an output;
    b. a first traveling wave structure comprising a first and a second waveguide having an input that is coupled to the output of the carrier signal source, the first and second waveguide propagating the carrier traveling wave;
    c. a second traveling wave structure having an outgoing signal port that receives an outgoing signal and a bi-directional signal port that receives an incoming electrical signal and provides the outgoing signal, the first and second traveling wave structures comprising optical waveguides and traveling wave modulation electrodes having at least one of positions and dimensions with respect to each other that form a tapered electromagnetic interaction that results in a desired outgoing-to-incoming signal isolation; and
    d. a detector having an input that is coupled to the output of the first traveling wave structure, the detector generating an electrical signal related to the incoming electrical signal.

2. The bi-directional signal interface of claim 1 wherein the carrier signal source comprises an optical source.

3. The bi-directional signal interface of claim 1 wherein the first traveling wave structure comprises a first and a second optical waveguide.

4. The bi-directional signal interface of claim 1 wherein the second traveling wave structure comprises at least one RF electrode.

5. A bi-directional signal interface comprising:
    a. an optical source that generates an optical carrier traveling wave at an output;
    b. a first traveling waveguide structure comprising a first and second waveguide having an input that is coupled to the output of the optical source, the first and second waveguide propagating the optical carrier traveling wave;
    c. a second traveling waveguide structure comprising traveling wave modulation electrodes having an outgoing signal port that receives an outgoing signal and a bi-directional signal port that receives an incoming electrical signal and provides the outgoing signal, the first and second traveling wave structures comprising optical waveguides and traveling wave modulation electrodes having at least one of positions and dimensions with respect to each other that form a tapered that results a desired outgoing-to-incoming signal isolation; and d. an optical detector having an input that is optically coupled to the output of the first and second waveguide, the optical detector generating an electrical signal related to the incoming electrical signal.

6. The bi-directional signal interface of claim 5 wherein the electromagnetic interaction region is tapered.

7. The bi-directional signal interface of claim 5 wherein the first and second waveguides are substantially straight over at least a portion of the interaction region and the traveling wave modulation electrodes are tapered over at least a portion of the interaction region.

8. The bi-directional signal interface of claim 5 wherein the traveling wave modulation electrodes are substantially straight over at least a portion of the interaction region and the first and second waveguides are tapered over at least a portion of the interaction region.

9. The bi-directional signal interface of claim 5 wherein both the traveling wave modulation electrodes and the first and second waveguides are tapered over at least a portion of the interaction region.

10. The bi-directional signal interface of claim 5 wherein the electromagnetic interaction region has a co-sinusoidal tapered electromagnetic interaction function.

11. The bi-directional signal interface of claim 5 wherein the tapered electromagnetic interaction region is chosen to provide a desired modulation efficiency of the incoming electrical signal on the optical carrier traveling wave.

12. The bi-directional signal interface of claim 5 wherein the tapered electromagnetic interaction function increases the outgoing-to-incoming signal isolation compared with a step-like electromagnetic interaction function.

13. The bi-directional signal interface of claim 5 wherein the bi-directional signal interface comprises an antenna interface, the incoming electrical signal comprising a signal received with an antenna, and the outgoing electrical signal comprising a signal to be transmitted by the antenna.

14. An optical modulator comprising:
a. optical waveguides having an input that receives an optical beam; and
b. traveling wave modulation electrodes having an outgoing signal port that receives an outgoing signal and a bi-directional signal port that receives an incoming electrical signal and provides the outgoing signal, the optical waveguides and traveling wave modulation electrodes having at least one of positions and dimensions with respect to each other that form a tapered electromagnetic interaction region which results in a desired outgoing-to-incoming signal isolation.

15. The optical modulator of claim 14 wherein the tapered electromagnetic interaction function is chosen to achieve a desired modulation efficiency.

16. The optical modulator of claim 14 wherein the optical waveguides are substantially straight over at least a portion of the interaction region and the modulation electrodes are tapered over at least a portion of the interaction region.

17. The optical modulator of claim 14 wherein the modulation electrodes are substantially straight over at least a portion of the interaction region and the optical waveguides are tapered over at least a portion of the interaction region.

18. The optical modulator of claim 14 wherein both the modulation electrodes and the optical waveguides are tapered over at least a portion of the interaction region.

19. The optical modulator of claim 14 wherein the tapered electromagnetic interaction region has a co-sinusoidal tapered electromagnetic interaction function.

* * * * *